US010103423B2

(12) United States Patent
Jarvis et al.

(10) Patent No.: US 10,103,423 B2
(45) Date of Patent: Oct. 16, 2018

(54) MODULAR STRUCTURAL AND FUNCTIONAL SUBASSEMBLIES

(71) Applicant: Apple Inc., Cupertino, CA (US)

(72) Inventors: Daniel W. Jarvis, Sunnyvale, CA (US); Richard Hung Minh Dinh, Santa Clara, CA (US); Miguel C. Christophy, San Francisco, CA (US); Hao Xu, Cupertino, CA (US); Jayesh Nath, Cupertino, CA (US); Jared M. Kole, San Jose, CA (US); Mattia Pascolini, Campbell, CA (US); Ruben Caballero, San Jose, CA (US); Jennifer M. Edwards, San Francisco, CA (US); Peter I. Bevelacqua, San Jose, CA (US); Robert W. Schlub, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1234 days.

(21) Appl. No.: 14/020,676

(22) Filed: Sep. 6, 2013

(65) Prior Publication Data

US 2014/0361935 A1   Dec. 11, 2014

Related U.S. Application Data

(60) Provisional application No. 61/832,704, filed on Jun. 7, 2013.

(51) Int. Cl.
*H01Q 1/24* (2006.01)
*G06F 1/16* (2006.01)
(Continued)

(52) U.S. Cl.
CPC ............ *H01Q 1/24* (2013.01); *G06F 1/1613* (2013.01); *G06F 1/1626* (2013.01);
(Continued)

(58) Field of Classification Search
CPC ........ H01Q 1/24; H01Q 1/243; H04M 1/0249
See application file for complete search history.

(56) References Cited

U.S. PATENT DOCUMENTS

| 4,047,182 A | 9/1977 | Faren |
| 5,673,054 A | 9/1997 | Hama et al. |

(Continued)

FOREIGN PATENT DOCUMENTS

| CN | 1539146 | 10/2004 |
| CN | 101867629 | 10/2010 |

(Continued)

OTHER PUBLICATIONS

PCT Application No. PCT/US2014/041086—International Search Report and Written Opinion dated Sep. 24, 2014.

(Continued)

*Primary Examiner* — Jessica Han
*Assistant Examiner* — Amal Patel
(74) *Attorney, Agent, or Firm* — Michael H. Lyons

(57) ABSTRACT

A housing for a personal electronic device is described herein. The housing may include at least one modular subassembly configured to be arranged within an internal cavity of the housing. The at least one modular subassembly is aligned with a feature external to the housing, is affixed to an interior surface of the internal cavity, and is configured to function both as an antenna and as an internal support member of the housing.

20 Claims, 8 Drawing Sheets

(51) Int. Cl.
*H04M 1/02* (2006.01)
*H04M 1/18* (2006.01)

(52) U.S. Cl.
CPC .......... *G06F 1/1637* (2013.01); *G06F 1/1656* (2013.01); *H04M 1/0202* (2013.01); *H04M 1/0249* (2013.01); *H04M 1/185* (2013.01); *Y10T 29/49002* (2015.01); *Y10T 29/49861* (2015.01)

(56) References Cited

U.S. PATENT DOCUMENTS

| | | |
|---|---|---|
| 6,480,157 B1 | 11/2002 | Palmer et al. |
| 6,507,322 B2 * | 1/2003 | Fang ............... H01Q 21/24 343/702 |
| 8,270,914 B2 | 9/2012 | Pascollini et al. |
| 2002/0021250 A1 * | 2/2002 | Asano ............... H01Q 1/2266 343/702 |
| 2003/0174093 A1 | 9/2003 | Huber |
| 2004/0070867 A1 | 4/2004 | Kudo et al. |
| 2005/0002122 A1 | 1/2005 | Ozaki et al. |
| 2005/0099344 A1 | 5/2005 | Okubo |
| 2006/0055608 A1 | 3/2006 | Minemura |
| 2007/0164022 A1 | 7/2007 | Sea et al. |
| 2007/0205946 A1 | 9/2007 | Buris et al. |
| 2008/0143609 A1 | 6/2008 | Mashima et al. |
| 2009/0033551 A1 * | 2/2009 | Hsu ............... G01S 19/36 342/357.64 |
| 2009/0067141 A1 | 3/2009 | Dabov et al. |
| 2009/0224982 A1 | 9/2009 | Isoda et al. |
| 2009/0303691 A1 | 12/2009 | Choi |
| 2009/0315781 A1 | 12/2009 | Tsai et al. |
| 2010/0103069 A1 | 4/2010 | Wang et al. |
| 2010/0321253 A1 | 12/2010 | Ayala Vazquez et al. |
| 2011/0102289 A1 | 5/2011 | Leem et al. |
| 2011/0241949 A1 | 10/2011 | Nickel et al. |
| 2011/0248389 A1 | 10/2011 | Yorita et al. |
| 2011/0291896 A1 | 12/2011 | Pascolini et al. |
| 2012/0009983 A1 * | 1/2012 | Mow ............... H01Q 1/243 455/575.7 |
| 2012/0081873 A1 | 4/2012 | Baska et al. |
| 2012/0086609 A1 | 4/2012 | Kikuchi et al. |
| 2012/0127044 A1 * | 5/2012 | Mashima ............... H01Q 1/242 343/702 |
| 2012/0157175 A1 | 6/2012 | Golko et al. |
| 2012/0262345 A1 | 10/2012 | Kim et al. |
| 2012/0299841 A1 | 11/2012 | Tang et al. |
| 2013/0078398 A1 | 3/2013 | Weber |
| 2014/0009894 A1 | 1/2014 | Yu |
| 2014/0126159 A1 | 5/2014 | Lin et al. |
| 2014/0354486 A1 | 12/2014 | Flores-Cuardras et al. |

FOREIGN PATENT DOCUMENTS

| | | |
|---|---|---|
| CN | 102640073 | 8/2012 |
| CN | 202602744 | 12/2012 |
| JP | 11274747 | 10/1999 |
| JP | 2002154529 | 5/2002 |
| JP | 2003051183 | 2/2003 |
| JP | 2004134036 | 4/2004 |
| KR | 100673957 | 1/2007 |
| TW | M444669 | 1/2013 |

OTHER PUBLICATIONS

PCT Application No. PCT/US2014/041086—International Preliminary Report on Patentability dated Dec. 17, 2015.

* cited by examiner

MODULAR STRUCTURAL AND FUNCTIONAL SUBASSEMBLIES

CROSS-REFERENCE TO RELATED APPLICATIONS

The present application claims the benefit under 35 U.S.C. 119(e) of U.S. Prov. Pat. Appl. No. 61/832,704, entitled MODULAR STRUCTURAL STIFFENERS filed on Jun. 7, 2013, the content of which is incorporated herein by reference in its entirety.

FIELD OF THE DESCRIBED EMBODIMENTS

The described embodiments relate generally to personal electronic devices and more particularly to internal structural members and subassemblies of the same.

BACKGROUND

Generally, personal electronic devices take a plurality of forms and are manufactured using available materials which provide a balance of durability and function. Many electronic devices include a plurality of internal components that are assembled into a functional unit to which a housing is "snapped" over. For example, devices having plastic housings or covers are typically formed as standalone devices absent a housing, and after testing and/or inspection, have a flexible or relatively flexible plastic housing applied thereon.

However, depending upon the internal components, structural members, frames, composition of the housing, and other aspects of a finished device, application of the housing after internal assembly can cause warping of edges of the housing (e.g., while snapping the housing over components), cosmetic defects (e.g., deflection, discoloration, and/or chipping of decorations/cosmetic surfaces), and in some cases breaking of the housing or internal components.

Therefore, what is desired are innovations in device structures and assembly methodologies which overcome these and other drawbacks.

SUMMARY OF THE DESCRIBED EMBODIMENTS

This paper describes various embodiments that relate to personal electronic devices. More particularly, methods, apparatuses, and systems are described which provide modular subassemblies for personal electronic devices.

According to an exemplary embodiment, a housing for a personal electronic device is disclosed. The housing may include at least one modular subassembly configured to be arranged within an internal cavity of the housing. The at least one modular subassembly is aligned with a feature external to the housing. The at least one modular subassembly is affixed to an interior surface of the internal cavity. Furthermore, the at least one modular subassembly is configured to function both as an antenna and as an internal support member of the housing.

According to another exemplary embodiment, a system of modular subassemblies for a personal electronic device is disclosed. The system may include a substantially planar chassis configured to be arranged within an internal cavity of a housing and a first modular subassembly configured to be arranged within the internal cavity about a periphery of the chassis. The first modular subassembly is further configured to be aligned with a feature external to the housing, and to function as an electrical component and as an internal support member for the personal electronic device. The system may further include a second modular subassembly configured to be arranged adjacent to the first modular subassembly, and configured to function as an additional internal support member for the personal electronic device.

According to yet another exemplary embodiment, a method of assembling a personal electronic device is disclosed. The method can include forming a housing having an internal cavity defined therein and aligning, inserting, and affixing at least one modular subassembly within the internal cavity of the housing. The at least one modular subassembly is aligned with a feature external to the housing. The at least one modular subassembly is affixed to an interior surface of the internal cavity. Furthermore, the at least one modular subassembly is configured to function as an antenna and as an internal support member of the housing.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments relate generally to personal electronic devices and more particularly to internal structural members and subassemblies of the same. According to exemplary embodiments, internal structural members of a personal electronic device may be divided into structural and/or functional subassemblies that are assembled into a housing cavity, rather than the alternative. By assembling subassemblies into the housing cavity, stress on housings made from less rigid materials (e.g., plastic) may be reduced, resulting in better cosmetic qualities than conventional assembly methodologies. Furthermore, by assembling subassemblies into the housing, exacting tolerances may be maintained through adjustable joints which allow alignment of individual subassemblies according to external features of the housing (e.g., button features, switch features, charging port features, etc.) and also allow alignment between adjacent subassemblies.

According to at least one exemplary embodiment, a device housing is formed of plastic and an associated modular subassembly is formed of metal. In one configuration, the associated modular subassembly is comprised of a plurality of "puzzle" parts that are initially separate from one another and configured to be joined together within the device housing in a specific manner. Thus, at least a portion of the associated modular subassembly may function as a support member, and can further function as an active or passive electrical component such as an antenna. Other subassemblies may function to provide mechanical stiffness for interaction with input devices such as switches and buttons. Hereinafter exemplary embodiments of the present invention are described in detail.

Figure 1A:
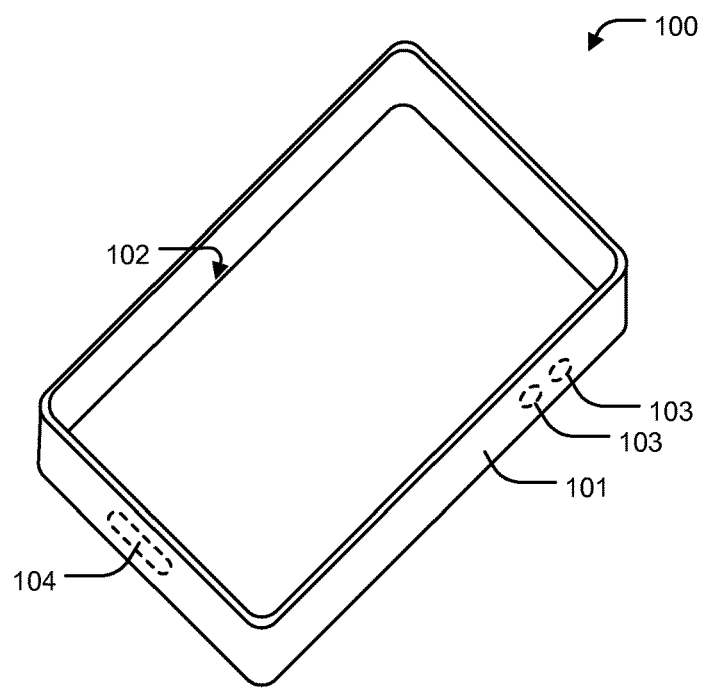
FIG. 1A is a perspective view of a housing for a personal electronic device, according to an exemplary embodiment.

FIG. 1A is a perspective view of a housing 100 for a personal electronic device, according to an exemplary embodiment. The housing 100 may be a housing for a cellular telephone, media player, tablet computer, or any other personal electronic device. The housing 100 may be formed of plastic in some embodiments. According to at least one embodiment, the housing 100 is formed of acrylonitrile butadiene styrene (ABS) plastic or a functionally equivalent plastic material.

The housing 100 may have an external surface 101 and an internal cavity 102 defined therein. The internal cavity 102 may be sized to accommodate modular subassemblies as described herein for assembling a personal electronic device. The external surface 101 may be a cosmetic surface and/or peripheral surface surrounding the internal cavity 102. Furthermore, the external surface 101 may include a plurality of external features 103, 104 defined thereon. The external features 103, 104 may be features for integrating input/output devices or other systems. According to one embodiment, the external features 103, 104 include button features, switch features, charging port features, audio port features, memory slot features, subscriber identity module (SIM) card receiving features, and/or any other feasible features.

Figure 1B:
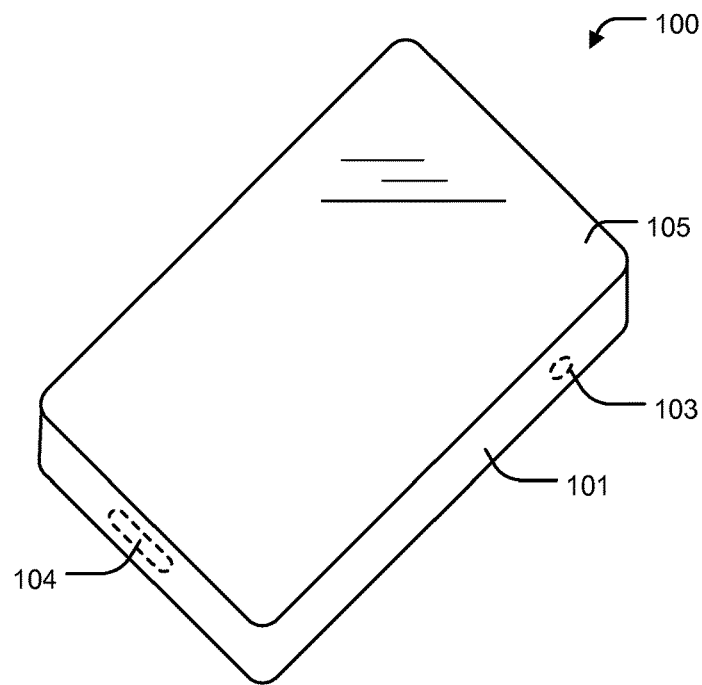
FIG. 1B is an alternate perspective view of the housing of FIG. 1A.

FIG. 1B is an alternate perspective view of the housing 100 of FIG. 1A. As shown, the housing 100 may further include a back surface 105 opposite the internal cavity 102 and adjacent the external surface 101. As further shown, features 103, 104 may exist on any portion of the surfaces of the housing 100.

Figure 2:
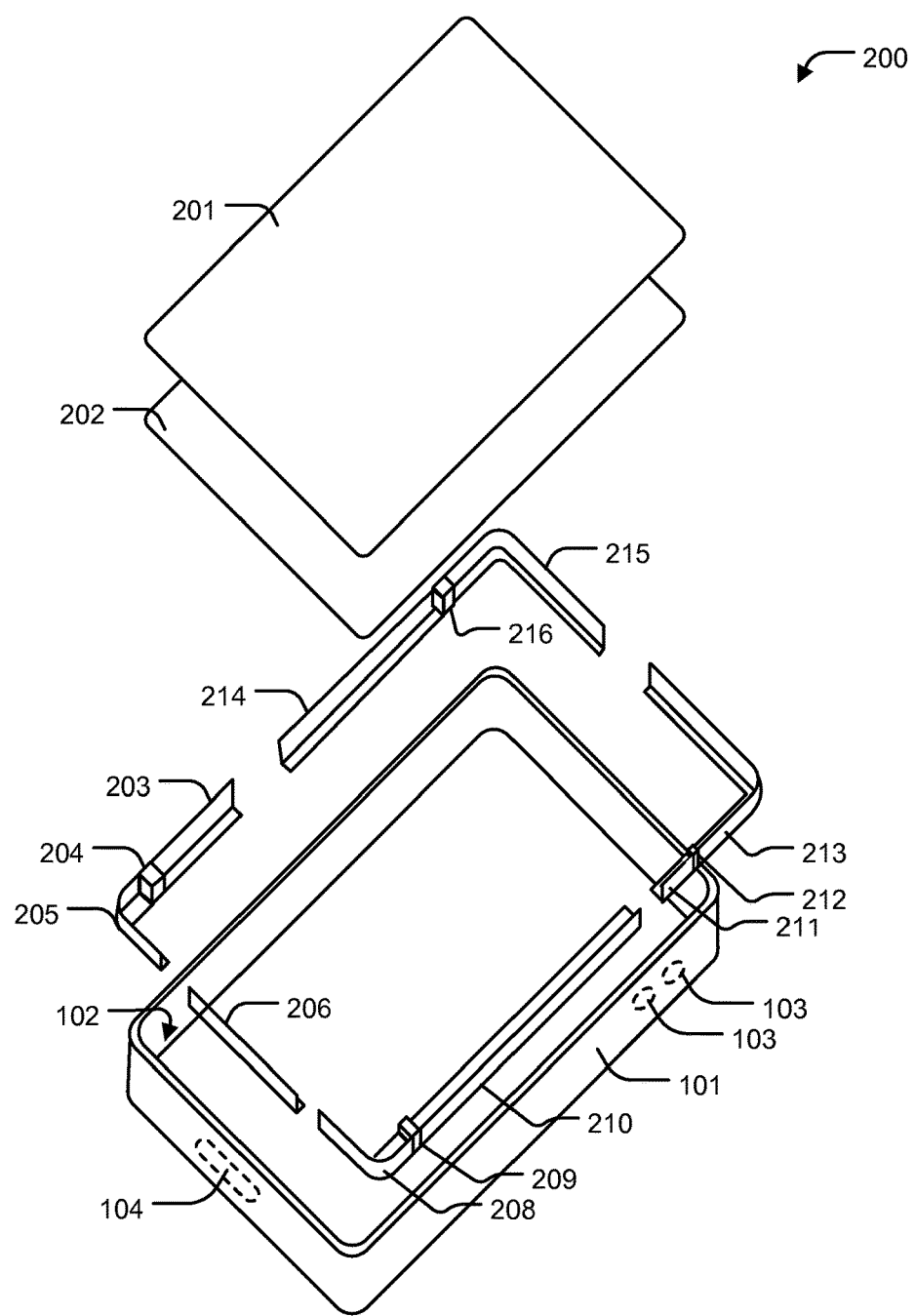
FIG. 2 is an exploded view of modular subassemblies of a personal electronic device, according to an exemplary embodiment.

FIG. 2 is an exploded view of modular subassemblies 200 (e.g., a system of modular subassemblies) of a personal electronic device, according to an exemplary embodiment. As illustrated, the subassemblies 200 may include a plurality of members arranged to be received within housing 100. The subassemblies 200 may include at least two separate members 201 and 203, according to one embodiment. According to another embodiment, the modular subassemblies 200 may include at least two separate members 201 and 205.

Generally, subassembly 201 may be a chassis arranged to be affixed to an interior surface of the cavity 102. The chassis 201 may be formed of relatively stiff material such as, for example, stainless steel, steel, aluminum, or any other suitable material. The chassis 201 may be substantially planar and/or substantially rectangular. The chassis 201 may also function as a ground plane for an end device. The chassis 201 may be affixed to the housing 100 through an adhesive member 202. The adhesive member 202 may be a pressure sensitive adhesive member in one embodiment.

The modular subassembly 203 may be a side support member arranged to be affixed to an interior surface of the internal cavity 102 opposite the external surface 101. The side support member 203 may be formed of relatively stiff material such as, for example, stainless steel, steel, aluminum, or any other suitable material.

The modular subassembly 205 may be a corner support member arranged to be affixed proximate an internal corner of the internal cavity 102 opposite the external surface 101. The corner support member 205 may be formed of relatively stiff material such as, for example, stainless steel, steel, aluminum, or any other suitable material.

The support members 203, 205 may be joined with a joining member 204 to establish an L-shape that conforms to the internal bottom-left corner of the internal cavity 102 (where similar L-shapes are established to conform to the other internal corners of the internal cavity 102). According to one embodiment, the joining member 204 is an insert molded plastic member affixed to both support members 203, 205 and keeping the same a relatively fixed, predetermined distance apart.

The modular subassemblies 200 may further include a spanning member 206 arranged to span between corner support members 205, 208 and align with feature 104. The spanning member is arranged to be affixed to an interior surface of the internal cavity 102 opposite the external surface 101. The corner support member 208 may be relatively similar in function to corner support member 205.

The modular subassemblies 200 may further include side support member 210 arranged to be joined to corner support member 208 through joining member 209. Side support member 210 may be relatively similar in function to support member 203. Furthermore, joining member 209 may be relatively similar to joining member 204.

Generally, members 203-210 may form a bottom portion of the subassemblies 200, and may be arranged to be inserted and affixed to housing 100 after alignment/registration with any associated features 103, 104. As further illustrated, modular subassemblies 200 further include members 211-216 which are arranged to form a top portion of the subassemblies 200, and may be arranged to be inserted and affixed to housing 100 after alignment/registration with any associated features 103, 104. For example, side support member 211 is arranged to be joined with corner support member 213 through joining member 212. Furthermore, corner support member 215 is arranged to be joined with side support member 214 through joining member 216. Hence, in the embodiment illustrated in FIG. 2, the modular subassemblies 200 include nine main components (i.e., members 203, 205, 206, 208, 210, 211, 213, 214, and 215) that are joined to one another via four sub-components (i.e., joining members 204, 209, 212, and 216). As noted above, the modular subassemblies 200, when joined to one another via the joining members, can be utilized as an antenna for enabling the end device to transmit and receive wireless signals.

It is noted that although a particular number of side support members and corner support members have been illustrated, the same may be varied to include more or less individual members according to any desired implementation of exemplary embodiments. It is further noted that the subassemblies 200 may each be formed of steel, stainless, steel, aluminum, or any other suitable material. According to at least one embodiment, individual subassemblies of the subassemblies 200 are formed of sheet metal or stainless steel sheet metal.

As noted above, several different corner members may be joined to side support members through joining members. These joining members 204, 209, 212, and 216 may be formed in an insert molding process such that each joining member is an insert molded plastic member affixed to both adjacent support members 203, 205; 208, 210; 211, 213; and 214, 215, respectively, and keeping the same a relatively fixed, predetermined distance apart (e.g., see FIG. 7). The joining members 204, 209, 212, and 216 may be formed of plastic and/or a dielectric.

Figure 3:
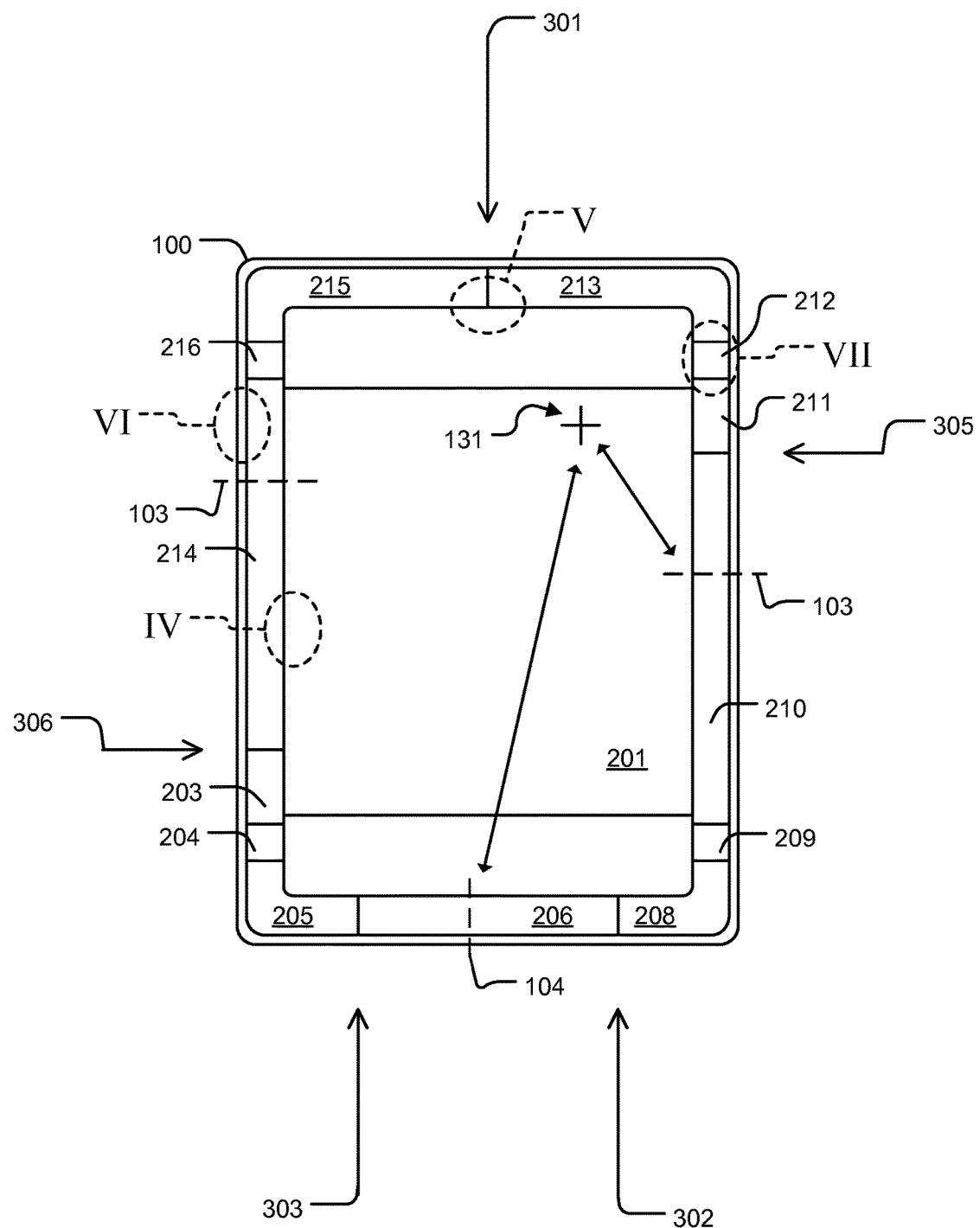
FIG. 3 is a plan view of a housing for a personal electronic device with affixed modular subassemblies, according to an exemplary embodiment.

Upon joining, the joined members, the spanning member 206, and the chassis 201 may be aligned/registered and inserted/affixed to the housing 100. For example, FIG. 3 is a plan view of the housing 100 with affixed modular subassemblies 200, according to an exemplary embodiment.

As shown, the joined members 214, 215 may be aligned with associated features 103 and inserted in the housing 100. Furthermore, joined members 208, 210 may be aligned with associated features 103 and inserted in the housing 100. Even further, spanning member 206 may be aligned with associated features 104 and inserted into the housing 100. Moreover, joined members 211, 213 and 203, 205 may be further aligned and inserted in the housing 100. Although not particularly illustrated, it is understood that alignment for these members may be relative to features 103, 104 or according to other features of the housing 100. Therefore, the housing 100 itself acts as an assembly/datum fixture for registering/aligning the subassemblies 200.

Each of the members 203-216 may be affixed to an interior surface of the interior cavity 102 of the housing 100 using, for example, an adhesive or glue. The adhesive or glue may include any suitable adhesive chemistry, including pressure sensitive, heat sensitive, or any other feasible chemistry.

Upon affixing the members 203-216, the chassis 201 may be aligned/registered with the housing 100 and inserted into the same adjacent to internal edges of the members 203-216. Adhesive member 202 is not illustrated here for clarity. For example, one or more optical fiducial markers or other alignment features 131 may be present on the chassis 201. The alignment features 131 may include a coordinate point/axis, screw hole, welded stud, welded nut, pin hole, or any other suitable feature. Using a relative location of the alignment features 131 as compared to features 103, 104 of the housing 100, the chassis 201 may be aligned.

Thereafter, the individual members 201-216 may be fastened to one another, for example, through welding (e.g., laser welding). Fastening joints 301, 302, 303, 305, and 306 are illustrated. According to one embodiment, the fastening joints 301, 302, 303, 305 and 306 comprise lap joints for ease in aligning and registering adjacent members. Furthermore, as shown, joints 305 and 306 are generally out of alignment. This may enhance the structural integrity of an end device. However, according to some embodiments, joints 305 and 306 may generally be aligned. As further shown, spanning member separates joints 302, 303 from a centerline formed at joint 301. This may also enhance the structural integrity of an end device. However, according to some embodiments spanning member 206 may instead be omitted. Hereinafter, expanded, detailed views of the annotated portions of FIG. 3 are described in detail with reference to FIGS. 4-7.

Figure 4:
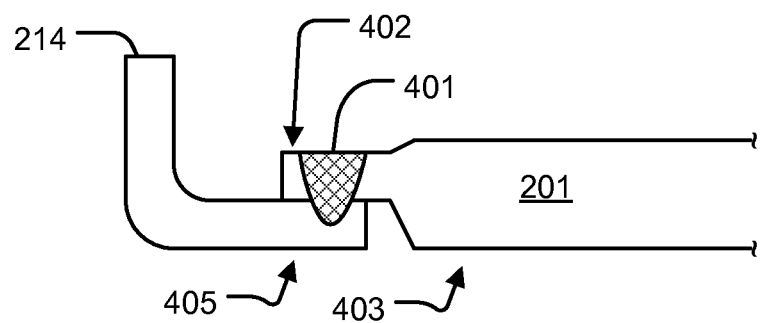
FIG. 4 is an expanded view of a fastening joint of a modular subassembly, according to an exemplary embodiment.

FIG. 4 is an expanded view of a fastening joint of a modular subassembly, according to an exemplary embodiment. As illustrated, a peripheral edge 402 of the chassis 201 may be welded or otherwise fastened (e.g., through screws, glue, etc.) to an interior edge 405 of an adjacent support member (illustrated as 214). The weld pool 401 may penetrate the edge 402 but not the edge 405 such that the housing 100 is not deformed or damaged. This may be accomplished through modulation or change to a laser intensity and/or duration, or by any other feasible manipulation of a welding system. As further shown, a thickness of an interior portion 403 of the chassis 201 is generally greater than that of the edge 402. Therefore, a good weld may be formed without burning through member 214. It is noted that similar fastening welds may be formed between chassis 201 and members 203, 210, and 211.

Figure 5:
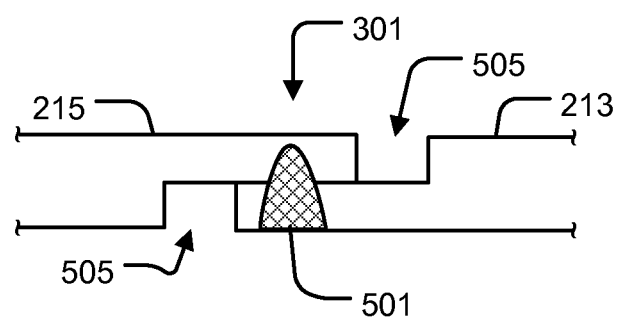
FIG. 5 is an expanded view of a fastening joint of a modular subassembly, according to an exemplary embodiment.

FIG. 5 is an expanded view of a fastening joint of a modular subassembly, according to an exemplary embodiment. As illustrated, joint 301 (and similarly, joints 302, 303, 305, and 306) is a lap joint allowing for contraction or expansion of areas 505 for appropriate alignment of individual members within the housing 100. Upon proper alignment, the adjacent members may be welded to one another through, for example, laser welding and formation of weld pool 501. As shown, weld pool 501 only fully penetrates an interior portion of the lap joint, thereby avoiding damage to the housing 100.

Figure 6:
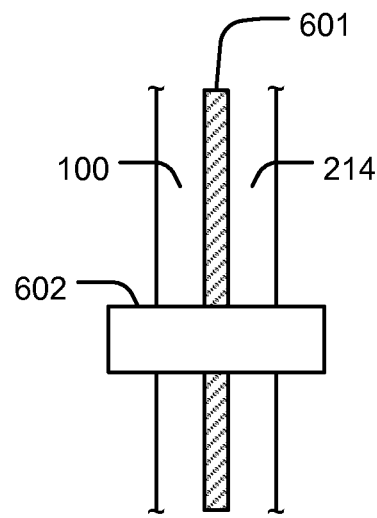
FIG. 6 is an expanded view of an interface between a modular subassembly and housing, according to an exemplary embodiment.

FIG. 6 is an expanded view of an interface between a modular subassembly and housing, according to an exemplary embodiment. As noted above, individual side and corner support members may be adhered to an interior surface of the interior cavity 102 of the housing 100. For example, glue 601 may be applied to either or both of the housing 100 and the associated support members (shown as 214). Upon appropriate alignment, a spring loaded clip or biasing member 602 may gently maintain alignment while glue or adhesive 601 is allowed to cure. Upon curing (or upon curing and welding as described above), the biasing member 602 may be removed. It is noted that although only a single biasing member 602 is illustrated, a plurality of separate biasing members 602 may be used in actual implementation, for example, by clipping around a periphery of the housing 100 while glue or adhesive is allowed to cure.

Figure 7:
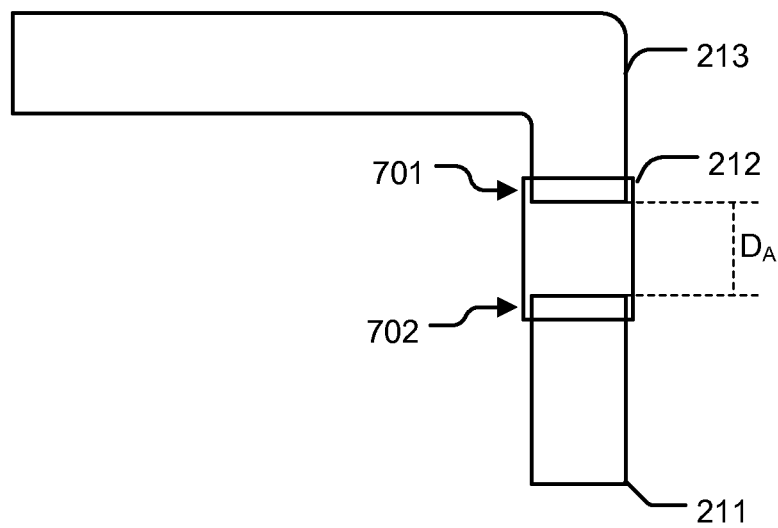
FIG. 7 is an expanded view of an interface between modular subassemblies, according to an exemplary embodiment.

As described above with reference to FIG. 2, joining members such as member 212 may be insert molded about two adjacent support members (e.g., a side support and corner support). FIG. 7 is an expanded view of an interface between modular subassemblies, according to an exemplary embodiment. As shown, the joining member 212 is insert molded about corner member 213 and side member 211 and maintains the same at a relatively fixed predetermined distance of $D_A$. According to one embodiment, the distance $D_A$ is an antenna gap to allow an appropriate capacitance between distal end 701 of corner support member 213 and distal end 702 of side support member 211, for example, if members 213 and 215 are to be used as an antenna. The distance $D_A$ may be altered according to any desired implementation. Furthermore, the distance $D_A$ may be changed, minimized, or maximized if member 213, 215 are not used as a portion of an antenna. Joining members 204, 209, and 216 may be formed similar to member 212, and therefore members 215, 205, 206, and 208 may also be used as a portion of an antenna in some embodiments.

Figure 8:
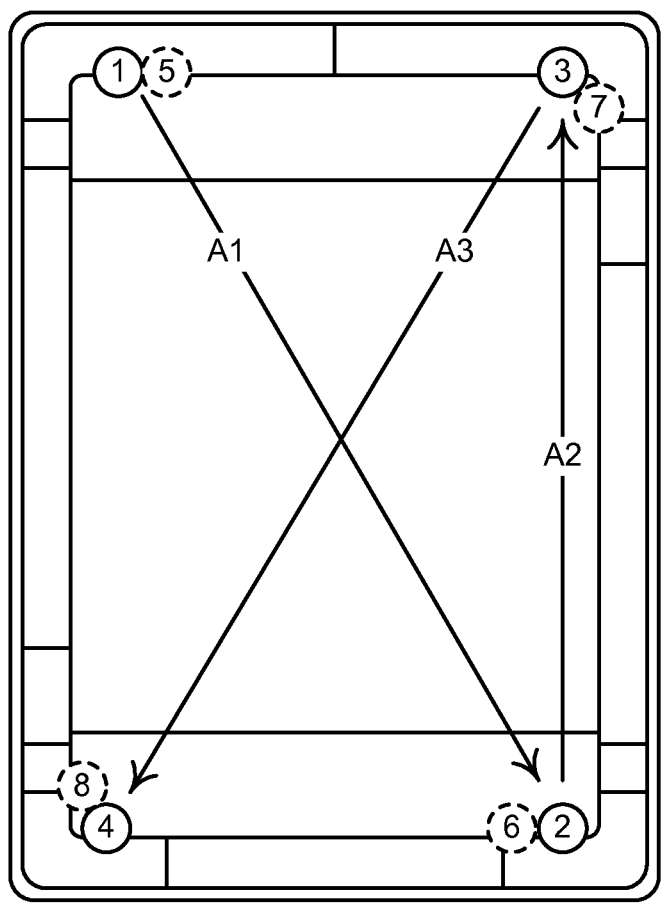
FIG. 8 depicts an example fastening path for fastening modular subassemblies, according to an exemplary embodiment.

As described above with reference to FIGS. 4-5, laser welds may be used to fasten adjacent subassembly members in some embodiments. However, welding may provide a significant source of heat which may damage a housing formed of, for example, plastic. FIG. 8 depicts an example fastening path for fastening modular subassemblies, according to an exemplary embodiment. As illustrated in FIG. 8, individual weld joints 1, 2, 3, 4 may be performed in succession at disparate portions of the illustrated structure to reduce localized heat buildup which would otherwise damage and/or warp housing 100. For example, one weld path may follow arrows A1, A2, and A3 in iterative succession in a clockwise manner (continued as joints 5, 6, 7, 8, etc.). The same may be altered or reversed in some embodiments. Still in other embodiments a time delay or other cooling mechanism may be included to reduce localized heat accumulation.

Figure 9:
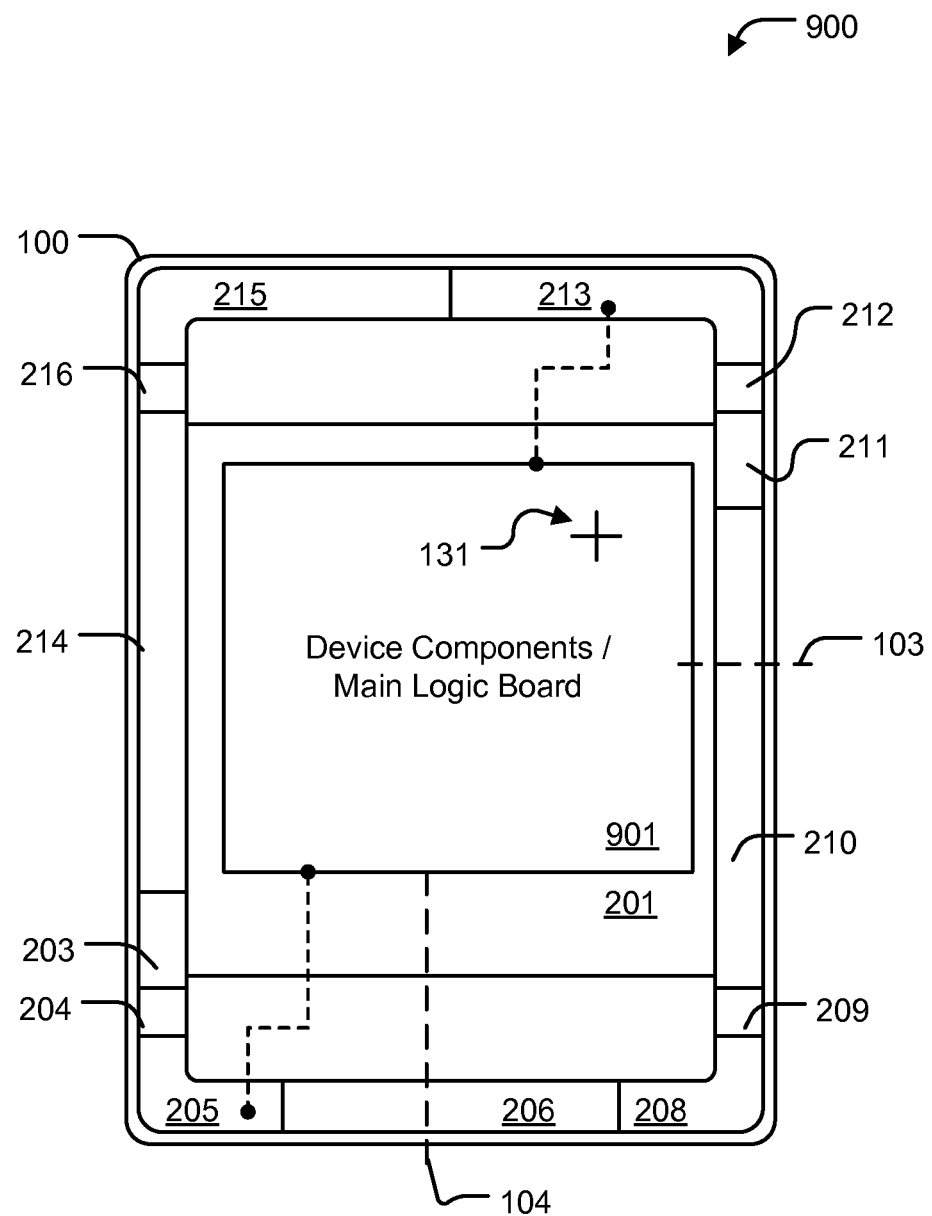
FIG. 9 is a schematic of a partially assembled personal electronic device, according to an exemplary embodiment.

Upon fastening of the modular subassemblies 200 within the housing 100, the chassis and housing may be populated with device components and/or logic boards 901. FIG. 9 is a schematic of a partially assembled personal electronic device 900, according to an exemplary embodiment. In device 900, the logic board 901, may for example, be mounted relative to the alignment feature(s) 131 to ensure proper placement with regards to external features of the housing 100. For example, features 103 may include switches, buttons or other input/output devices mechanically and/or electrically connected to the logic board 901. Features 104 may include charging ports, audio ports, or other features mechanically and/or electrically connected to the logic board 901. Moreover, corner support members 205, 208 and spanning member 206 (which may be welded and therefore in electrical communication) may be interfaced with logic board 901 as an antenna. Similarly, corner support members 213 and 215 (which may also be welded) may be interfaced with logic board 901 as an antenna as well.

Figure 10:
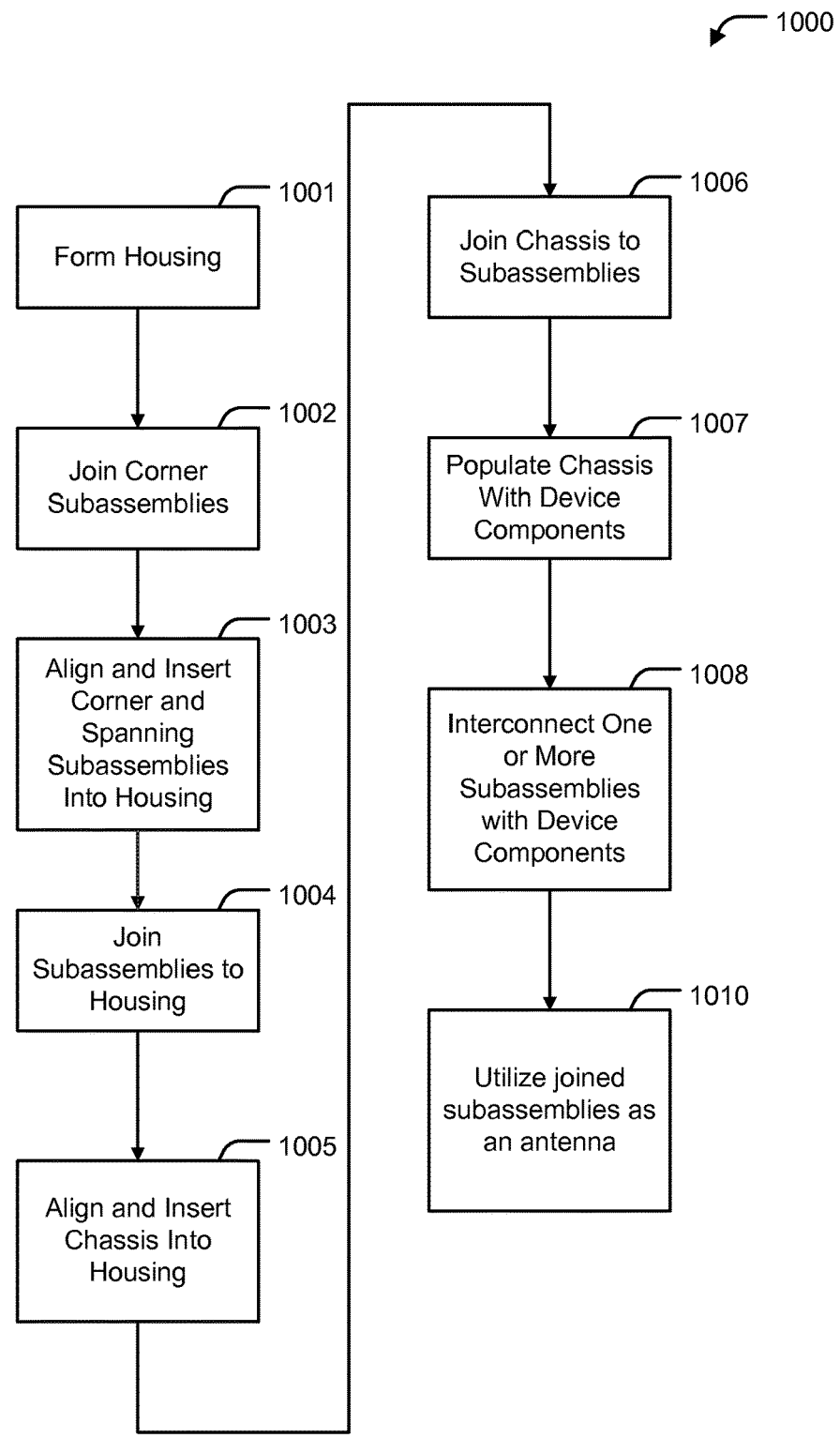
FIG. 10 is a flowchart of a method of assembling a personal electronic device, according to an exemplary embodiment.

FIG. 10 is a flowchart of a method 1000 of assembling a personal electronic device, according to an exemplary embodiment. The method 1000 includes forming a housing at step 1001. The forming may include molding or otherwise forming a housing (e.g., 100) from plastic. The housing may be painted, decorated, polished, and/or sealed with a clear coat in some embodiments.

Thereafter, the method 1000 includes joining corner subassemblies at step 1002. In some embodiments, steps 1001 and 1002 may be reversed or may be performed substantially in parallel. The joining may include insert molding joining members between corner assemblies and associated side support members as described above. Thereafter, the method 1000 includes aligning and inserting corner and spanning subassemblies into the formed housing at step 1003. The aligning and inserting may be performed as described above.

Thereafter, the method 1000 includes joining the subassemblies to the housing at step 1004. For example, spring loaded clips or biasing members may be used to hold the inserted subassemblies until an adhesive or glue cures. Thereafter, or at substantially the same time, the chassis may be aligned and inserted into the housing at step 1005.

The chassis may then be joined to the subassemblies at step 1006, for example, through laser welding, screws, bolts, adhesives, or any suitable manner of fastening. As previously described herein, the chassis (e.g., the chassis 201) can function as a ground plane within the end device. In this manner, the subassemblies can be grounded via the joining technique (e.g., welding) used to join the subassemblies to the chassis at step 1006. If welding, the welding process may be adjusted to reduce or minimize accumulation of heat proximate the housing. In this manner, distortion and damage to the housing may be minimized. After joining, at step 1007, the chassis and housing may be populated with device components such as, for example, input/output interfaces, logic boards, power supplies/batteries, transceiver circuitry, and/or other suitable components.

One or more subassemblies may then, at step 1008, be interconnected with the populated device components. For example, one or more corner subassemblies may be interconnected such that they may function as antennas or as electronic components for an end device. Finally, at step 1010, the end device can utilize the joined subassemblies as an antenna to facilitate wireless communication, e.g., with a base station.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An electronic device, comprising:
   a plastic housing comprising a back wall and a peripheral side wall extending around substantially an entire periphery of the back wall, the back wall and the peripheral side wall at least partially defining an internal cavity; and
   a structure arranged within the internal cavity, extending substantially completely along an interior surface of the peripheral sidewall, and comprising:
      a first metal support member affixed to the interior surface of the peripheral side wall and configured to provide structural support for the housing and configured to function as an antenna, the first metal support member defining a first interior edge extending at a first angle from a first side portion of the first metal support member;
      a second metal support member affixed to the interior surface of the peripheral side wall and configured to provide structural support for the housing, the second metal support member defining a second interior edge extending at a second angle from a second side portion of the second metal support member;
      a dielectric joining member joining the first metal support member to the second metal support member; and
      a chassis affixed to the first interior edge of the first metal support member and to the second interior edge of the second metal support member.

2. The electronic device of claim 1, wherein the housing is molded plastic.

3. The electronic device of claim 1, wherein the first metal support member and the second metal support member comprise stainless steel.

4. The electronic device of claim 1, wherein the chassis comprises:
   a first peripheral edge portion welded to the first interior edge; and
   a second peripheral edge portion welded to the second interior edge.

5. The electronic device of claim 1, wherein the dielectric joining member is an insert molded plastic member molded about respective distal ends of the first and second metal support members.

6. The electronic device of claim 1, further comprising a third metal support member affixed to the interior surface of the peripheral side wall and electrically and mechanically coupled to the first metal support member and configured to function as a portion of the antenna and as an additional internal support member of the electronic device.

7. The electronic device of claim 1, further comprising a third metal support member affixed to the interior surface of the peripheral sidewall and mechanically coupled to the second metal support member and configured to function as a second antenna and as an additional internal support member of the housing.

8. The electronic device of claim 1, wherein the chassis is adhered to the back wall of the plastic housing.

9. An electronic device, comprising:
   a housing defining an internal cavity;
   a first metal support member positioned within the internal cavity and defining a first side portion and a first interior edge extending from the first side portion at a first angle, the first metal support member configured to function as an antenna and an internal support member for the electronic device;
   a second metal support member positioned within the internal cavity and defining a second side portion and a second interior edge extending from the second side portion at a second angle, the second metal support member coupled to the first metal support member and configured to function as an additional internal support member for the electronic device; and
   a chassis positioned within the internal cavity and affixed to the first interior edge of the first metal support member and to the second interior edge of the second metal support member.

10. The electronic device of claim 9, wherein the chassis is welded to the first interior edge and the second interior edge.

11. The electronic device of claim 10, wherein the first metal support member is coupled to the second metal support member via a molded joining member formed from a dielectric material.

12. The electronic device of claim 9, wherein the chassis is welded to the first interior edge and the second interior edge.

13. The electronic device of claim 9, wherein:
   the housing is formed of plastic and comprises a back wall and a peripheral side wall extending around substantially an entire periphery of the back wall; and
   the chassis is adhered to the back wall of the housing.

14. The electronic device of claim 9, wherein the chassis is further configured as a ground plane for the electronic device.

15. The electronic device of claim 9, wherein the housing is molded plastic.

16. The electronic device of claim 9, wherein the chassis, the first metal support member, and the second metal support member comprise stainless steel.

17. A method of assembling a personal electronic device, comprising: forming a housing having an internal cavity defined therein; inserting a first metal support member in the internal cavity of the housing, the first metal support member defining a first side portion and a first interior edge extending from the first side portion at a first angle, the first metal support member configured to function as an internal support member for the personal electronic device; affixing the first metal support member to a first interior surface of the internal cavity; inserting a second metal support member in the internal cavity of the housing, the second metal support member defining a second side portion and a second interior edge extending from the second side portion at a second angle, the second metal support member configured to function as an internal support member for the personal electronic device; affixing a chassis positioned within the internal cavity to the first interior edge of the first metal support member and to the second interior edge of the second metal support member; and electrically coupling the first metal support member to electronic circuitry to allow the first metal support member to function as an antenna for the personal electronic device.

18. The method of claim 17, wherein forming the housing comprises molding the housing from plastic.

19. The method of claim 17, further comprising welding the chassis to the first interior edge of the first metal support member and to the second interior edge of the second metal support member.

20. The method of claim 17, wherein:
inserting the second metal support member in the internal cavity comprises setting the second metal support member apart from the first metal support member by a distance; and
molding a dielectric joining member around portions of the first and second metal support members, thereby mechanically joining the first metal support member to the second metal support member.

\* \* \* \* \*